Jan. 11, 1955     W. E. BLAIR     2,699,065
ANGLE OF ATTACK INDICATOR
Filed Oct. 9, 1952     2 Sheets-Sheet 1
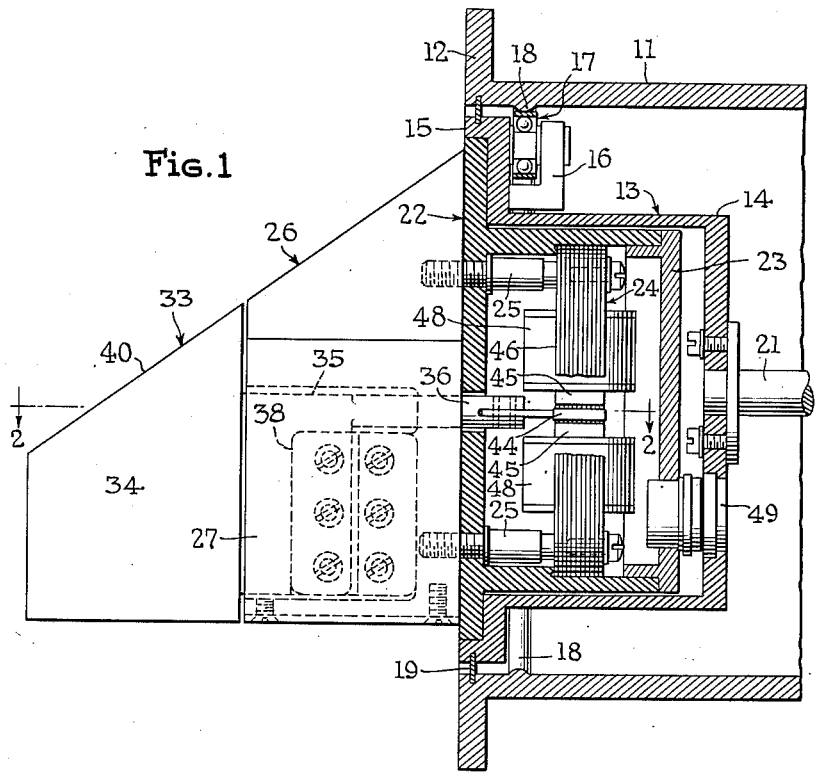
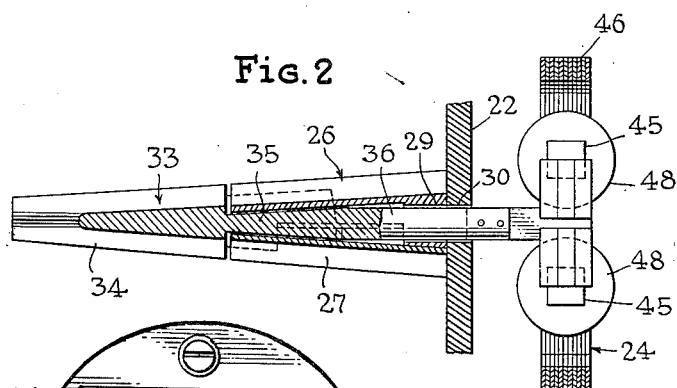
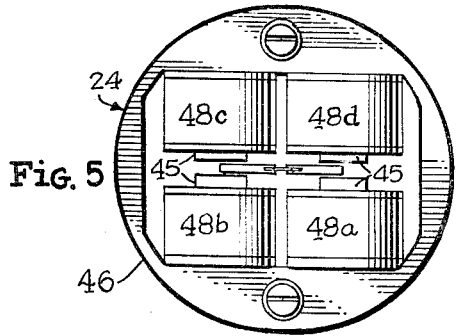
INVENTOR
William E. Blair
BY Dodge and Sons
ATTORNEYS Jan. 11, 1955  W. E. BLAIR  2,699,065
ANGLE OF ATTACK INDICATOR
Filed Oct. 9, 1952  2 Sheets-Sheet 2

INVENTOR
William E. Blair
BY
Dodge and Sons
ATTORNEYS

നo. 2,699,065

ANGLE OF ATTACK INDICATOR

William E. Blair, Redondo Beach, Calif., assignor to Servomechanisms, Inc., Westbury, N. Y., a corporation of New York Application October 9, 1952, Serial No. 313,906

5 Claims. (Cl. 73—180)

This invention relates to direction indicating means. Specifically it relates to a device for use on aircraft which indicates the angle of attack of the aircraft. The term "angle of attack" as used throughout this specification means the angle between a given reference plane passing through the longitudinal axis of the aircraft and the direction of the airstream past the aircraft. As thus defined the term "angle of attack" includes both angle of fore and aft trim and angle of yaw.

In recent years it has become increasingly important that the pilot of an aircraft be apprised of the angle of attack. This angle for any given plane varies with plane speed, plane weight, the load, including the constantly changing fuel load, and the wind direction and velocity.

Angle of attack indicators of the pneumatically actuated type have been proposed. Such devices, as long as they are properly calibrated, operate in a satisfactory manner. However, they are of necessity light in construction and will not stand up under the severe conditions of use which they encounter. Secondly the ports and passages through which the pneumatic forces are sensed and measured must be clean, because any obstructions will cause an inaccurate indication of the forces measured.

Mechanical indicators have also been proposed, but have in general proved insensitive and inaccurate because of excessive friction between the moving parts of the sensing mechanism.

The present invention contemplates an improved mechanical sensing element in which the inaccuracy and insensitivity due to friction are reduced to a minimum.

The sensing element is designed so that its aerodynamic characteristics are stable over a wide range of Mach number and including values of the Mach number greater than unity.

The device senses the local angle of attack close to the fuselage of the aircraft. Thus the angle indicated must be corrected to afford an indication of the true angle of attack. This correction is a non-linear function of the Mach number. The way in which this correction of the indicated local angle of attack is obtained is not a part of the present invention, although the use of this sensing element with a corrected output to indicate true angle of attack is contemplated.

The sensing mechanism comprises a cylindrical housing in the aircraft fuselage, the outer end of which is flush with the fuselage surface. Rotatably mounted in this housing is a cylindrical body having a mounting flange which carries a suitable bearing which engages the housing. The cylindrical body is mounted eccentrically of the flange and the housing. A two piece hub is received by the cylindrical body. Each component of the hub carries part of an electrical plug. Projecting outward from the hub is a two-piece vane structure. The two vanes are interconnected by a flexible member. This flexible member may be a flexure plate, a torsion rod or the like. The outer vane member carries on an inward directed projection, an armature member which controls the output of the magnetic pick-off device in the hub. The magnetic pick-off device is part of a servo-motor follow-up device.

The vane portions are normally alined with the airstream and their angular position indicates the local angle of attack. The outer vane is subjected to lift forces whenever it is out of alinement with the airstream. These forces shift the vane toward a position in which the lift force disappears, i. e. a position in which the vane is again alined with the airstream. This shifting of the outer vane element causes the armature of the pick-off device to be shifted and changes its output. The changed output of the pick-off device energizes the servo-motor device which in turn rotates the hub and the inner vane member in a direction to restore alinement between the two vane members. This causes the pick-off mechanism to return to its normal balanced condition, and de-energize the servo-motor. The angular displacement of the hub or the motor can be measured and affords an indication of the local angle of attack. It will be apparent that various types of pick-off device may be used instead of the magnetic device referred to.

The use of a flexible member between the portions of the sensing vane as distinguished from an articulated structure eliminates friction between parts, so that the outer member is sensitive to minor misalinement between it and the airstream.

The inner and outer hub members are separable whereby easy replacement of the inner hub which carries the sensing device is afforded.

A preferred embodiment of the invention will be described having reference to the accompanying drawings in which Figure 1 is an elevation of the device partly in axial section.

Figure 2 is a sectional view taken on line 2—2 of Figure 1.

Figure 5 is a detailed view showing in front elevation the construction of a magnetic pick-off device.

Figure 3:
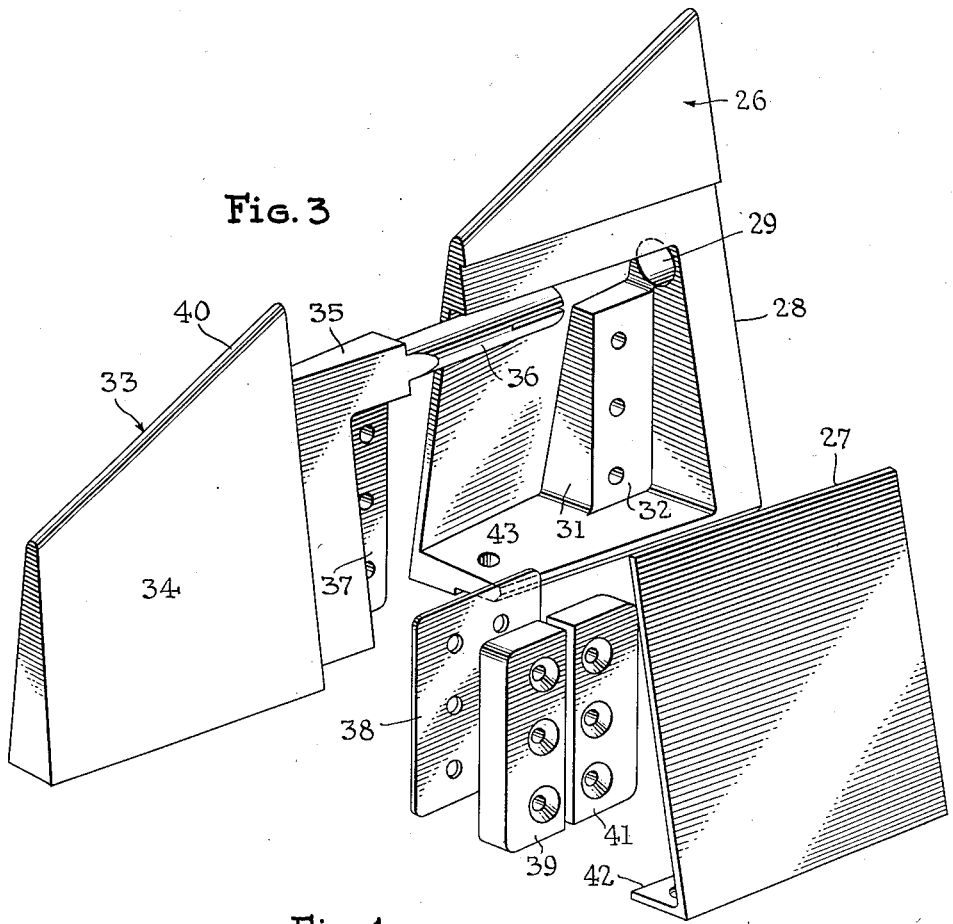
Figure 3 is an exploded perspective view of the vane members.

All statements of direction appearing in the following specification refer to the apparatus as shown in Figure 1.

Referring first to Figure 1, the sensing device comprises a generally cylindrical housing 11 which is arranged transversely of the longitudinal axis of the aircraft. The cylindrical housing 11 is provided at its outer end with a flange 12 by which it is rigidly attached to the fuselage of the aircraft. The outer surface of the flange 12 is flush with the outer surface of the fuselage.

A hub generally indicated at 13 is rotatably mounted in the housing 11. The hub 13 comprises an inner cylindrical portion 14 which is located eccentrically to the projecting flange 15. The flange 15 carries near its periphery bearing supports 16, one of which appears in Figure 1. Carried by each of the supports 16 is the inner race of a ball bearing assembly 17. The outer race of the ball bearing assembly 17 engages a circumferential ridge 18 provided on the inner surface of the housing 11. A flexible dust seal 19 is mounted between the housing 11 and the outer periphery of the flange 15. This dust seal is in the form of an annulus and is made of a flexible plastic material, for example a synthetic rubber.

Connected to the hub 13 is a driven shaft 21 which is arranged coaxially with the cylindrical housing 11. An inner hub member 22 is mounted within the cylindrical portion 14 of the hub member 13. The members 13 and 22 are closely fitted to one another so that relative rotation between these parts is inhibited. The hub member 22 is provided with an axial opening the inner end of which is closed by means of a cover 23. Mounted within the opening is a magnetic pick-off device generally indicated by the reference numeral 24. This pick-off device 24 is rigidly secured to the outer face of the hub member 22 by studs 25 which project through this outer face. The combined spacer and housing assembly 26 is secured to the outer face of the housing 22 by means of these studs.

The construction of this housing 26 will be best understood by having reference to Figure 3. As shown in this figure, assembly 26 takes the form of a truncated triangular pyramid. A removable cover 27 is provided on housing 26. The end face 28 of the housing 26 is provided with an opening 29 alined with an opening 30 in the outer face of the hub 22. Extending between the lower face of the housing 26, as seen in Figure 3, to a point just beneath the hole 29 is a mounting boss 31 which is provided with a planar mounting face 32. An imaginary plane passing through this face 32 includes the axis of the opening 29.

Associated with the assembly 26 is a sensing vane 33. The portion 34 of the vane 33 which projects beyond the housing 26 is also formed as a truncated triangular pyramid. The vane 33 is provided on its inner face with a boss 35. A generally cylindrical stem 36 projects from the boss 35 and passes through the opening 29 in the housing 26 when the parts are in their assembled relation, as shown in Figures 1 and 2. A mounting boss having a planar mounting face 37 is provided near the inner edge of the sensing vane 33. The plane of face 37 and the axis of stem 36 lie in the median longitudinal plane passing through the leading edge 40 of the sensing vane 33. During assembly of the sensing unit the vane 33 is moved toward the assembly 26 so that the stem 36 passes through the opening 29. The inner and outer faces of the vane 33 and the assembly 26 respectively are proximate to each other when the device is assembled.

A flexure plate 38 preferably made of a beryllium copper alloy extends between the mounting faces 32 and 37 and is held securely against these faces by means of clamping blocks 39 and 41. After the blocks 39 and 41 have been secured in place, the cover 27 is replaced on the housing 26 and is secured by means of screws which pass upwardly through the flange 42 and the base 43 of the housing 26. Carried at the inner end of the stem 36 is a flat armature member 44.

The magnetic pick-off device 24 comprises four laminated core members 45. These members being arranged in laterally spaced pairs, the cores in each pair being alined and having between their ends a fixed air gap. The core members 45 are formed integrally with an outer generally annular laminated core member 46. Cores 45 are encircled by windings 48a, 48b, 48c and 48d. The cores 45 and windings 48 are constructed so that their magnetic properties are as nearly identical as possible and so that the magnetic fields in the air gaps between the opposed pairs of cores 45 are directed axially of these cores and are parallel with one another. The length of the armature 44 corresponds to the distance between the centers of the two pairs of opposed cores 45.

A two piece electrical plug 49 is mounted between the inner and outer hubs 13 and 22, the mating parts of the plugs being carried respectively by the inner and outer hubs. Wiring connections between the windings 48 and the plug 49 have been omitted in the interest of clarity. It will be understood that this wiring is conventional.

Figure 4:
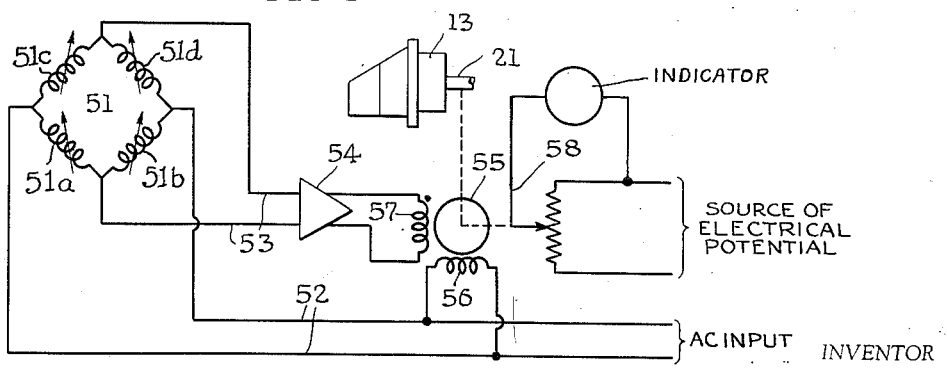
Figure 4 is a diagrammatic showing of an electric indicating circuit embodying the invention.

Figure 4 constitutes a wiring diagram of the sensing device and the associated indicating circuit.

The windings of the magnetic pick-off device are connected basically as an induction bridge as shown in Figure 4 at 51. The induction bridge 51 is connected with a suitable A. C. input by power lines 52. The arms 51a, 51b, 51c and 51d correspond respectively to the windings 48a, 48b, 48c and 48d. The output from the induction bridge 51 is connected by lines 53 to an amplifier 54. The output of this amplifier 54 is used to energize a two phase motor 55. One of the phase windings 56 of the motor 55 is connected across the A. C. input, the other phase 57 is connected to be energized by the output of the amplifier 54. The motor 55 drives, through suitable gearing, the shaft 21 of the sensing mechanism. Rotation of the motor also drives a precision potentiometer 58. The output of the potentiometer 58 may be supplied to an indicating mechanism. It will be understood that the output from the potentiometer 58 may also be passed to some mechanism in which a correction factor is applied so that the resulting indication is an indication of the true angle of attack rather than the local angle of attack which is indicated if no correction factor is introduced.

The operation of the device will be best understood by having reference to Figures 1 and 2.

To facilitate description it will be assumed that the aircraft is moving along a line of flight from bottom to top along the plane of Figure 1.

The sensing mechanism is originally calibrated so that the median longitudinal plane of the sensing vane 33 is parallel with the longitudinal axis of the aircraft. When the aircraft is inflight and the vane 33 is alined with the airstream flowing past the aircraft, the vane 33 will be alined with the housing 26 and the armature 44 will be located as it is shown in Figure 2. If the angle of attack changes then the direction of the airstream past the vane 33 will be changed and a lift force will be produced which will displace the vane 33 relatively to the housing 26. This displacement occurs as a result of flexure of the plate 38. The spacing between the proximate faces of the housing 26 and the vane 33 is reduced to the minimum which will afford clearance between these two parts in all positions of the vane 33. There are no frictional forces acting between the vane 33 and the assembly 26. The only force which opposes the displacement of the vane 33 is the resilience of the flexure plate 38. The displacement of the vane 33 from alinement with the assembly 26 causes the armature 44 to be displaced transversely of the cores 45 in the magnetic pick-off device 24. The output of the magnetic pick-off device 24 is changed by an amount which depends upon this transverse displacement of the armature 44. The phase relation of this output is varied in accord with the direction of motion of the member 44. Since the displacement of the armature 44 varies both the magnitude and the phase of the output of the pick-off device, the motor 55 which is normally inactive is energized to rotate the shaft 21 in a direction which corresponds to the change in phase relation.

The motor 55 rotates the shaft 21 in a direction such that alinement of housing 26 and vane 33 is restored. The realinement of these parts causes the armature 44 to be returned to its normal position and thus de-energizes the motor 55. The angular displacement of the housing 26 from its initial position may be determined by any means which will indicate the amount of rotation of the motor 55. In the preferred embodiment, rotation of the motor 55 is caused to actuate a precision potentiometer 58 thus giving an electrical signal, the strength of which is dependent upon the adjustment of the potentiometer.

The bridge 51, the amplifier 54 and the motor 55 constitute a servo-motor follow-up mechanism. The invention is not limited to use of the particular follow-up mechanism described.

In the illustrated embodiment of the invention the flexure plate is mounted so that it flexes about a line parallel with the outer surface of the hub 22. This line of flexure could be arranged at various angles to this surface. The angle is selected having regard to the desired sensitivity of the instrument.

The vane 33 and the housing 26 are formed as truncated triangular pyramids for the reason that an air foil of this configuration is aerodynamically stable over a wide range of Mach number. The range including Mach numbers in excess of one. The apex angle at the leading edge 40 of the vane 34 is preferably greater than six degrees. This form of vane is not the only one which has stable aerodynamic characteristics and other airforms may be used.

The device constructed according to the teachings of this invention has two main advantages over the pneumatic devices which are known in the art. Initial calibration of the instrument is easy, it being a simple bore sighting operation. The component parts of the device may be of rigid construction so that they stand up under the hard usage to which they are exposed without at the same time sacrificing the sensitivity required of such an instrument. The sensing portion of the mechanism is substantially free of friction because the only connection between the housing 26 and the vane 33 is the flexure plate 38. In this connection it should be noted that the armature 44 is freely movable in the air gap of the magnetic pick-off device 24 and therefore does not introduce friction. The advantages resulting from the use of a flexure plate can be attained in other ways. In essence the flexure plate is a plate spring but it might take the form of a rod or sleeve loaded in torsion. The use of various types of springs is contemplated.

The second advantage which is peculiar to the particular construction of the preferred embodiment is that the sensing element may be replaced with ease. The inner hub 22 is axially slidable of the hub 13 and may be withdrawn therefrom, and this entire assembly replaced by a new sensing element. Provision of the plug 49 eliminates the necessity of breaking any electrical connections which would have to be resoldered or rewired. Therefore maintenance of the sensing unit need not interfere with the operation of the aircraft on which the invention is to be used as a new sensing element may be inserted in the hub 13.

The device is intended primarily for use on military aircraft and the ability to make a speedy replacement of the device is important. The present invention provides for quick replacement without sacrificing the sensitivity and accuracy of the indication afforded by it.

What is claimed is:

1. Means for determining the local angle of attack of an aircraft comprising in combination a rotatable hub carried by the aircraft and having its axis arranged transversely to the longitudinal axis thereof; a sensing vane; a resilient member interconnecting the vane and the hub, said vane projecting longitudinally from said hub into the airstream past the aircraft and normally aligned therewith; a servo-motor follow-up mechanism connected to rotate said hub; and means responsive to displacement of the sensing vane relative to the hub for energizing said servo-motor follow-up mechanism to rotate said hub in a direction corresponding to the direction of displacement of the vane, which displacement occurs as a result of a change in the direction of said airstream relative to said vane, the rotation of said hub being in a direction to align said vane and said airstream.

2. The combination defined in claim 1 in which said follow-up mechanism comprises an induction bridge carried by said hub; an armature carried by said vane and shiftable therewith to vary the output of said bridge; and a two phase motor electrically connected to the output of said bridge and mechanically connected to said hub.

3. The combination defined in claim 1 in which said resilient member is a flexure plate, the axis of flexure of said plate being angularly displaced from the axis of said hub.

4. The combination defined in claim 1 in which said vane is spaced from the fuselage of the aircraft; and a housing attached to said hub and enclosing said resilient member.

5. Means for indicating the local angle of attack of an aircraft comprising in combination a rotatable hub having its axis arranged transversely to the longitudinal axis of the aircraft; a sensing vane projecting axially from said hub; a flexure plate interconnecting the hub and the vane; a normally balanced induction bridge carried by said hub; an armature connected to the sensing vane, and movable therewith, said armature being located in the magnetic field of said bridge, said sensing vane being normally alined with the airstream and subject to lift forces when misalined therewith whereby said vane and the armature connected thereto are moved relatively to said hub, movement of said armature creating an unbalance in said bridge; a normally inert motor energized in response to said unbalance and effective when energized to rotate said hub and said bridge and thereby rebalance the latter; and means indicating the angular position of said hub.

References Cited in the file of this patent

UNITED STATES PATENTS

| 2,465,999 | Brady | Apr. 5, 1949 |
| 2,472,653 | Eaton | June 7, 1949 |
| 2,609,685 | Andresen | Sept. 9, 1952 |

FOREIGN PATENTS

| 876,027 | France | July 13, 1942 |